Sept. 29, 1970   J. B. BUICE   3,531,693
ELECTROLYTIC CAPACITOR WITH RUTHENIUM METAL CATHODE SURFACE
Filed June 11, 1968
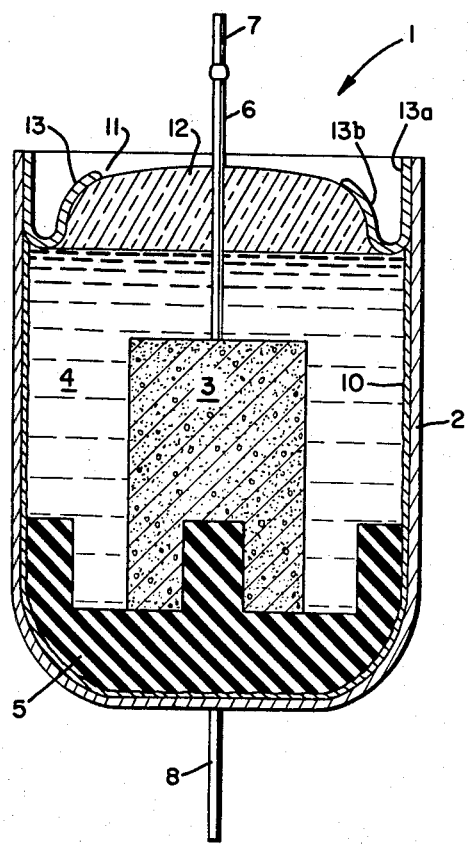
INVENTOR.
JOEL B. BUICE

United States Patent Office 3,531,693
Patented Sept. 29, 1970

3,531,693
ELECTROLYTIC CAPACITOR WITH RUTHENIUM METAL CATHODE SURFACE
Joel B. Buice, Columbia, S.C., assignor to General Electric Company, a corporation of New York
Filed June 11, 1968, Ser. No. 736,064
Int. Cl. H01g 9/08
U.S. Cl. 317—230                                              7 Claims

ABSTRACT OF THE DISCLOSURE

The deposition of a spongy ruthenium layer on the inner surface of the casing cathode of a liquid (or gel) electrolyte porous anode capacitor effectively increases the area of the cathode. The use of ruthenium permits the advantageous utilization of cathode metals such as nickel and titanium with non-corrosive electrolytes. Increased adherence of the deposited ruthenium layer permits a wider variety of operational uses and contributes to long life performance and functional stability.

BACKGROUND OF THE INVENTION

Field of the invention

The present invention relates to electrolytic capacitors and more particularly to porous anode capacitors having improved cathode or internal case area enhancement.

Description of the prior art

Liquid or gel electrolyte porous anode type capacitors require cathodes of very high capacitance density (microfarads per square inch). This is necessary because the effective anode area is very large and because the total capacitance of the device is dependent upon both anode capacitance or area and cathode capacitance or area. The very large effective area of the anode structure is realized by sintering very fine particles of valve metals to form a porous body. To obtain best utilization of the effective anode area it is desirable to provide a cathode of greatly expanded surface area. As cathode area or capacitance becomes increasingly larger and approaches a theoretically infinite value the total unit capacitance approaches the capacitance of the anode.

Increased effective cathode surface area (cathode enhancement) may be achieved by depositing a conductive layer of particles on the inner surface of the capacitor cathode casing. In currently available porous anode capacitors the cathode enhancement material usually employed is platinum, palladium or rhodium. Typically, these metals are deposited on silver or silver alloy casings as known in the art with reasonably good results. It has been found, however, that platinum, palladium, and rhodium yield unsatisfactory results when deposited upon other cathode metals such as nickel and titanium. In particular, it has been found that the deposited layers lacked the tenacity required to withstand substantial vibration during operation and that capacitors employing these cathodes exhibited relatively inferior electrical properties.

SUMMARY OF THE INVENTION

It is, therefore, an object of the present invention to provide a cathode enhancement material which contributes to a porous anode electrolytic capacitor having superior electrical properties.

It is another object of this invention to provide a cathode enhancement material which is particularly adherent to a cathode surface such as nickel and titanium thus precluding capacitor operational problems caused by loose particles contacting the dielectric film.

It is still another object of this invention to provide a liquid or gel porous anode type capacitor utilizing a less costly titanium cathode metal and a ruthenium cathode enhancement material.

Other objects and advantages will become apparent from the following description and appended claims.

In accordance with the objects of this invention a liquid or gel electrolyte porous anode capacitor is provided which utilizes ruthenium as the cathode enhancement material. Ruthenium enhancement permits the effective use of nickel as a cathode metal where non-corrosive electrolytes are employed. The resulting capacitor is at least comparable, in quality and performance, to conventional silver or silver alloy casing-platinum or palladium enhanced capacitors, and is significantly less costly. In addition, it has been found that ruthenium enhanced-titanium case capacitors are significantly superior to platinum, palladium or rhodium enhanced-titanium case capacitors. Titanium as a case cathode for liquid (or gel) electrolyte porous anode type capacitor is more fully disclosed in copending application Ser. No. (736,055 Buice et al.), filed June 11, 1968 and assigned to the same assignee as the present invention.

BRIEF DESCRIPTION OF THE DRAWINGS

The invention will be better understood from the following description taken in conjunction with the accompanying drawing wherein:

FIG. 1 illustrates a liquid or gel electrolyte porous anode capacitor to which the present invention is applicable.

DESCRIPTION OF THE PREFERRED EMBODIMENTS

Referring now to FIG. 1, there is shown an electrolytic capacitor 1 comprising a cup-shaped casing 2 containing a sintered pellet anode 3 inserted therein, the casing serving as the cathode and having a cathode terminal lead 8 secured thereto. The casing 2 may be any well-known casing cathode metal and may include silver, silver alloys, nickel, titanium, aluminum, zinc, copper and the like. The inner surface of the casing 2 has an adherent ruthenium conducting layer 10, in accordance with the present invention, coated thereon to provide enhancement of the cathode area. The porous sintered anode 3 can be any of the well-known valve metals such as aluminum, zirconium, niobium, tantalum, etc., selected in accordance with the particular application for which it is desired, the electrolyte which is used and commercial cost considerations. Tantalum is the preferred anode material for most applications. The anode has an oxide dielectric film (not shown) formed over all surfaces thereof as is well known in the art. Anode 3 is immersed in a liquid or gel electrolyte 4 contained in casing 2. The electrolyte may be of any conventional or known type of capacitor electrolyte provided that it is not corrosive to the casing metal and will be suitable for the particular capacitor application.

An exemplary construction, casing 2 is a cup-shaped form having a single open end which is hermetically sealed. Within casing 2, there is positioned a bottom spacer 5 which is made of a chemically resistant insulating material having low vapor transmission and moisture absorbent characteristics, such as polytetrafluoroethylene (Teflon). Passing through the open end and extending outwardly of casing 2 is terminal lead wire 6, typically composed of tantalum, or other equivalent film forming or valve metal having similar thermal expansion properties, and having an anodic dielectric oxide film formed thereon, lead wire 6 being secured at its inner end to anode 3. At its outer end, terminal lead 6 is welded or otherwise joined to an external lead 7, usually composed of a solderable metal such as nickel, copper or the like.

Casing 2 is preferably closed at its open end by a glass-metal seal structure 11 which provides a strong, hermetic seal, which is compatible with electrolyte 4 and effectively prevents its escape from within casing 2 even under severe operating conditions of widely varying temperature and pressure. A glass-metal seal preferred for use on capacitors embodying the present invention is disclosed in U.S. Pat. 3,275,901, Merritt et al., assigned to the same assignee as the present invention. Briefly the seal structure comprises a metal retaining ring 13 having a rim portion 13a adapted to be secured to the adjacent wall portion by casing 2 by welding, soldering or other suitable means, and a tapered conical seal surface 13b in which glass material 12 is received and which has an axial opening for passage of lead wire 6 therethrough, as shown, glass 12 being fusion sealed to ring 13 and lead 6. Where both the casing 2 and the retaining ring 13 are formed of the same metal galvanic corrosion is avoided and metallurgical bonding is improved. It should be understood, however, that any casing seal which is appropriate, considering the proposed capacitor use and environment, may be used in conjunction with the present invention.

The application of a spongy or porous ruthenium conducting layer to the inner surface of the cathode casing 2 to enhance the effective area thereof, may be accomplished by any well-known chemical or electrochemical technique. One effective technique includes etching the inner surface of the capacitor casing 2 with one of many etchant solutions known to those skilled in the electrolytic capacitor art, washing the casing using deionized water, drying the casing at about 85–125° C., and then depositing the ruthenium layer from a solution of about 1% ruthenium trichloride by heating both the casing and the ruthenium trichloride solution placed therein to about 125° C. Deposition is continued to achieve a ruthenium thickness corresponding to the desired capacitance.

In order to demonstrate the remarkable effectiveness of ruthenium enhancement on various cathode metals, sample capacitors were constructed and tested.

Nickel is a particularly advantageous cathode metal for use with non-corrosive electrolytes due to its relatively low cost. It is also desirable as a capacitor casing since it permits the relatively simple attachment of cathode leads thereto. These leads, typically formed of nickel or an alloy thereof, were particularly difficult to secure to silver or silver alloy casings and required the application of relatively sophisticated welding techniques. By contrast, the welding of nickel wires to nickel cases can be accomplished by conventional resistance welding techniques. Another advantage of nickel casings is that their use precludes galvanic action between the casing and the cathode lead. Heretofore galvanic corrosion occurred on the nickel lead wire where silver and silver alloy cases were used.

It has been found that nickel cathode capacitors enhanced by deposits of platinum, palladium or rhodium are not comparable to conventional silver cathode capacitors in many desirable characteristics. However, the use of ruthenium enhancement has now produced nickel cathode capacitors at least comparable to conventional silver cathode capacitors, and with noted improvements. Table I is a comparison of representative samples of 10 μ–25 volt conventional platinum enhanced-silver case capacitors with similarly rated ruthenium enhanced-nickel case capacitors over a 1000 hour life test. $I_L$ represents the 85° C. leakage current in microamperes. C is the capacitance in microfarads and percent D is the dissipation factor.

TABLE I

| Hours: | Silver case | | | Nickel case | | |
|---|---|---|---|---|---|---|
| | $I_L$ | C | Percent D | $I_L$ | C | Percent D |
| 0 | .05 | 9.56 | 4.2 | .12 | 9.49 | 4.1 |
| 250 | .03 | 9.28 | 4.3 | .07 | 9.67 | 4.0 |
| 500 | .03 | 9.22 | 4.4 | .04 | 9.66 | 4.1 |
| 1,000 | .03 | 9.12 | 4.5 | .04 | 9.62 | 3.9 |

From Table I it con be seen that both the silver case and the nickel case capacitors displayed comparable performance characteristics over the life of the test. It is noteworthy that the nickel case capacitors represent a substantial cost savings over the silver case capacitors.

Titanium cathodes and their attendant advantages in preventing dielectric film degradation induced by cathode plating as a result of reverse voltage are more fully disclosed in the noted copending application, Bruce et al. It has been found that ruthenium adhesion to titanium far exceeds the adhesion of conventional enhancement metals such as platinum and rhodium. In order to demonstrate this remarkable characteristic, sample titanium cases were internally coated in precisely the same manner with rhodium, platinum and ruthenium and the coated casing subjected to standard vibration test. Weight measurements were made to determine the weight gain as a result of deposition and the weight loss as a result of vibration testing. The ratio of weight loss to weight gain represents the percent loss in Table II.

TABLE II

| | Wt. gain, mgs. | Wt. loss, mgs. | Percent loss |
|---|---|---|---|
| Coating material: | | | |
| Rhodium | 1.1 | 1.0 | 91 |
| Platinum | 1.3 | 1.2 | 92 |
| Ruthenium | 0.5 | 0.1 | 20 |

It is evident from Table II that ruthenium adheres most tenaciously to titanium. A high degree of adhesion is essential for the case coating material in electrolytic capacitors. Loose particles may contact imperfection sites in the dielectric film and cause high and erratic leakage current under conditions of shock and vibration.

Ultrasonic testing was also conducted upon capacitors having ruthenium enhanced-titanium cases and rhodium enhanced-silver cases to determine the effect of such vibration upon leakage current. It was found that the leakage current of the ruthenium enhanced-titanium case capacitors decreased during testing whereas the leakage current of the rhodium enhanced-silver capacitor increased by factors of from about 5 to in excess of 1000.

Ruthenium enhanced-titanium case capacitors also consistently displayed superior electrical characteristics compared to platinum or rhodium enhanced-titanium cases. Table III compares average titanium case capacitance as a function of enhancing metal.

TABLE III

| Coating material: | Average Ti case capacitance (μf.) |
|---|---|
| Rhodium | 1393 |
| Platinum | 866 |
| Ruthenium | 1839 |

Ruthenium is not only particularly desirable as a cathode enhancement material for cathode cases other than conventionally employed silver and silver alloy cases, it is also extremely effective as a coating on silver and silver alloy cases. In this regard, it has been demonstrated over 10,000 hour life tests on 160 μf.–50 v. D.C. rated capacitors that the performance of ruthenium enhanced-silver case capacitors is virtually identical with that of rhodium enhanced-silver case capacitors. In fact for some applications, particularly low temperature applications, ruthenium enhanced-silver case capacitors are superior. For example, the percentage of room temperature capacitance retained at −55° C. is greater for ruthenium enhanced-silver case capacitors than for rhodium enhanced-silver case capacitors.

Another advantage of ruthenium as a case coating material is the relatively low cost of the basic plating material. By comparison rhodium is about three times as expensive and platinum almost 1½ times as expensive as ruthenium.

While the present invention has been described with reference to particular embodiments thereof, it will be understood that numerous modifications may be made by those skilled in the art without actually departing from the scope of the invention.

What is claimed as new and desired to be secured by Letters Patent of the United States is:

1. An electrolytic capacitor comprising:
   (a) a cathode casing having an open end;
   (b) said cathode casing having a ruthenium metal inner surface;
   (c) a cathode lead connected to said casing;
   (d) an electrolyte in said casing;
   (e) a sintered porous anode formed of a film forming metal having a dielectric film thereon in said casing and immersed in said electrolyte, said anode having a terminal lead extending through said open end; and
   (f) a closure sealing the open end.

2. The invention as recited in claim 1 wherein said inner surface is a coating of ruthenium of increased surface area.

3. The invention as recited in claim 2 wherein said ruthenium coating is a spongy layer of ruthenium of increased surface area.

4. A capacitor as claimed in claim 1 wherein said cathode casing is titanium.

5. A capacitor as claimed in claim 1 wherein said cathode casing is nickel.

6. A capacitor as claimed in claim 4 wherein said cathode lead is nickel.

7. A capacitor as claimed in claim 4 wherein said film forming metal is tantalum and wherein said closure hermetically seals said open end and comprises a titanium-to-glass seal bonded to the casing.

References Cited

UNITED STATES PATENTS

| | | | |
|---|---|---|---|
| 2,871,425 | 1/1959 | Burnham | 317—230 |
| 2,923,866 | 2/1960 | Wagner | 317—230 |

JAMES D. KALLAM, Primary Examiner

U.S. Cl. X.R.

317—233

Disclaimer 3,531,693.—*Joel B. Buice*, Columbia, S.C. ELECTROLYTIC CAPACITOR WITH RUTHENIUM METAL CATHODE SURFACE. Patent dated Sept. 29, 1970. Disclaimer filed June 25, 1971, by the assignee, *General Electric Company*.

Hereby enters this disclaimer to claims 1, 2, and 3 of said patent.

[*Official Gazette August 17, 1971.*]